US005222059A

United States Patent [19]

Holman

[11] Patent Number: 5,222,059
[45] Date of Patent: * Jun. 22, 1993

[54] SURROUND-SOUND SYSTEM WITH MOTION PICTURE SOUNDTRACK TIMBRE CORRECTION, SURROUND SOUND CHANNEL TIMBRE CORRECTION, DEFINED LOUDSPEAKER DIRECTIONALITY, AND REDUCED COMB-FILTER EFFECTS

[75] Inventor: Tomlinson Holman, Fairfax, Calif.

[73] Assignee: Lucasfilm Ltd., San Rafael, Calif.

[ * ] Notice: The portion of the term of this patent subsequent to Aug. 29, 2008 has been disclaimed.

[21] Appl. No.: 707,117

[22] Filed: May 28, 1991

Related U.S. Application Data

[63] Continuation of Ser. No. 366,991, Jun. 20, 1989, Pat. No. 5,043,970, which is a continuation-in-part of Ser. No. 141,570, Jan. 6, 1988, abandoned.

[51] Int. Cl.[5] .......... G11B 20/02
[52] U.S. Cl. .......... 369/89; 381/20
[58] Field of Search .......... 369/89-92; 381/17-22, 98, 103, 153, 155

[56] References Cited

U.S. PATENT DOCUMENTS

| | | | |
|---|---|---|---|
| 4,204,091 | 5/1980 | Ishigaki et al. | 369/89 |
| 4,251,685 | 2/1981 | Fellgett | 369/89 X |
| 4,332,986 | 6/1982 | Butler | 381/155 |
| 4,410,063 | 10/1983 | Yasue et al. | 381/155 X |
| 4,574,391 | 3/1986 | Morishima | 381/18 |
| 4,577,305 | 3/1986 | Allen et al. | 369/89 X |
| 4,589,129 | 5/1986 | Blackmer et al. | 381/21 |
| 4,612,665 | 9/1986 | Inami et al. | 381/98 |
| 4,661,982 | 4/1987 | Kitazato et al. | 381/98 X |
| 4,696,036 | 9/1987 | Julstrom | 381/22 |
| 4,736,426 | 4/1988 | Kinoshita et al. | 381/98 X |
| 4,739,513 | 4/1988 | Kunugi et al. | 381/103 |
| 4,807,217 | 2/1989 | Ide | 369/90 X |
| 4,823,391 | 4/1989 | Schwartz | 381/103 |

OTHER PUBLICATIONS

"The Influence of Room Boundaries on Loudspeaker Power Output" by Roy F. Allison J. Audio Eng. Soc., vol. 22, No. 5, Jun. 1974, pp. 314–320.

"Transformation of Sound Pressure Level from the Free Field to the Eardrum in the Horizontal Plane," E. A. G. Shaw, J.Acoust.Soc.Am., Dec. 1974, pp. 1848–1861.

"From Instrument to Ear in a Room: Direct or via Recording" by A. H. Benade, J.AudioEng.Soc., vol. 33, No. 4, Apr. 1985, pp. 218–233.

"Listening to Sound in Rooms" by W. M. Hartmann (abstract), J.Acoust.Soc.Am. Suppl. 1, vol. 83, Spring 1988, p. S74.

"Temporal Window Shape as a Function of Frequency and Level" by Christopher J. J. Plack et al, J. Acoust. Soc. Am., May 1990, pp. 2178–2187.

"New Factors in Sound for Cinema and Television" by Tomlinson Holman, J. Audio Eng. Soc., vol. 39, No. 7/8, Jul./Aug. 1991, pp. 529–539.

*Primary Examiner*—W. R. Young
*Attorney, Agent, or Firm*—Thomas A. Gallagher

[57] ABSTRACT

Spectral imbalance (alteration in timbre) when playing home video versions of motion pictures having soundtrack equalized for playback in a room whose room-loudspeaker system is aligned to the standard motion picture theater X-curve is overcome by timbre correction which compensates for the X-curve equalization. Surround-sound home playback of motion pictures is enhanced by employing main channel loudspeakers that produce generally direct sound fields and surround channel loudspeakers that produce generally diffuse sound fields. In addition, the reproduced surround-sound channel is further enhanced by decreasing the interaural cross-correlation of the surround-sound channel sound field and by reducing comb filtering effects in the surround-sound channel at listening positions within the room, preferably by introducing slight pitch shifting in the signals applied to multiple surround loudspeakers. Preferably, further equalization is applied to the reproduced surround channel to compensate for the differences in listener perceived timbre between the surround-sound channel and the main channels.

67 Claims, 5 Drawing Sheets

COORDINATES:

REAL AXIS POLE: $(2\pi)$15k RAD/SEC $\alpha_{RP} = -9.4248 \times 10^4$

DID EQUALIZER SECTION: $\omega_0 = (2\pi)\ 12.13\text{k}$ RAD/SEC $\theta_P = 51.88°$ ⟶ $\alpha_P \pm j\beta_P = -4.7046 \times 10^4 \pm j5.9962 \times 10^4$ $\theta_Z = 63.10°$ ⟶ $\alpha_Z \pm j\beta_Z = -3.4485 \times 10^4 \pm j6.7967 \times 10^4$

SURROUND-SOUND SYSTEM WITH MOTION PICTURE SOUNDTRACK TIMBRE CORRECTION, SURROUND SOUND CHANNEL TIMBRE CORRECTION, DEFINED LOUDSPEAKER DIRECTIONALITY, AND REDUCED COMB-FILTER EFFECTS

This is a continuation of application Ser. No. 07/366,991, filed Jun. 20, 1989, now U.S. Pat. No. 5,043,970, which is a continuation-in-part of application Ser. No. 07/141,570, filed Jan. 6, 1988, now abandoned.

BACKGROUND OF THE INVENTION

The invention relates generally to sound reproduction. More specifically, the invention relates to multiple channel sound reproduction systems having improved listener-perceived characteristics.

Multiple channel sound reproduction systems which include a surround-sound channel (often referred to in the past as an "ambience" or "special-effects" channel) in addition to left and right (and optimally, center) sound channels are now relatively common in motion picture theaters and are becoming more and more common in the homes of consumers. A driving force behind the proliferation of such systems in consumers' homes is the widespread availability of surround-sound home video software, mainly surround-sound motion pictures (movies) made for theatrical release and subsequently transferred to home video media (e.g., videocassettes, videodiscs, and broadcast or cable television).

When a motion picture is transferred from film to home video media, the soundtrack of the motion picture film is transferred essentially unaltered: the soundtrack on the home video medium is essentially an exact duplicate of the soundtrack on the film. Where reference is made below to playing a motion picture soundtrack in the home, it is to be understood that what is actually played in the home is some form of home video medium onto which the motion picture soundtrack has been transferred in an essentially unaltered form.

Although home video media have two-channel stereophonic soundtracks, those two channels carry, by means of amplitude and phase matrix encoding, four channels of sound information—left, center, right, and surround, usually identical to the two-channel stereophonic motion-picture soundtracks from which the home video soundtracks are derived. As is also done in the motion picture theater, the left, center, right, and surround channels are decoded and recovered by consumers with a matrix decoder, usually referred to as a "surround-sound" decoder. In the home environment, the decoder is usually incorporated in or is an accessory to a videocassette player, videodisc player, or television set/video monitor.

Motion picture theaters equipped for surround sound typically have at least three sets of loudspeakers, located appropriately for reproduction of the left, center, and right channels, at the front of the theater auditorium, behind the screen. The surround channel is usually applied to a multiplicity of speakers located other than at the front of the theater auditorium.

It is the recommended and common practice in the industry to align the sound system of large auditoriums, particularly a motion picture theater's loudspeaker-room response, to a standardized frequency response curve or "house curve." The current standardized house curve for movie theaters is a recommendation of the International Standards Organization designated as curve X of ISO 2969-1977(E), commonly called the X-curve.

The X-curve is a curve having a significant high-frequency rolloff. The curve is the result of subjective listening tests conducted in large (theater-sized) auditoriums. A basic rationale for such a curve is given by Robert B. Schulein in his article In Situ Measurement and Equalization of Sound Reproduction Systems, *J. AUDIO ENG. SOC.*, Apr. 1975, Vol. 23, No. 3, pp. 178–186. Schulein explains that the requirement for high-frequency rolloff is apparently due to the free field (i.e., direct) to diffuse (i.e., reflected or reverberant) sound field diffraction effects of the human head and ears. A distant loudspeaker in a large listening room is perceived by listeners as having greater high frequency output (i.e., to sound brighter) than a closer loudspeaker aligned to measure the same response. This appears to be a result of the substantial diffuse field to free field ratio generated by the distant loudspeaker; a loudspeaker close to a listener generates such a small diffuse to direct sound ratio as to be insignificant.

More recently the rationale has been carried further by Gunther Theile (On the Standardization of the Frequency Response of High-Quality Studio Headphones, *J. AUDIO ENG. SOC.*, Dec. 1986, Vol. 34, No. 12, pp. 956–969) who hypothesized that perceptions of loudness and tone color (timbre) are not completely determined by sound pressure and spectrum in the auditory canal. Theile relates this hypothesis to the "source location effect" or "sound level loudness divergence" ("SLD") which occurs whenever auditory events with differing locations are compared: a nearer loudspeaker requires more sound level (sound pressure) at the ear drums to cause the same perceived sound loudness as a more distant loudspeaker and the effect is frequency dependent.

It has also been recognized that the sound pressure level in a free (direct) field exceeds that in a diffuse field for equal loudness. A standard equalization, currently embodied in ISO 454-1975 (E) of the International Standards Organization, is intended to compensate for the differences in perceived loudness and, by extension, timbre due to frequency response changes between such sound fields.

Perceived sound loudness and timbre thus depends not only on the location at which sound fields are generated with respect to the listener but also on the relative diffuse (reflected or reverberant) field component to free (direct) field component ratio of the sound field at the listener.

The use of the standardized X-curve in motion picture theatres is significant because in the final steps of mixing motion picture soundtracks, the soundtracks are almost always monitored in large (theater-sized) auditoriums ("mixing" and "dubbing" theaters) whose loudspeaker-room responses have been aligned to the standardized response curve. This is done, of course, with the expectation that such motion picture films will be played in large (theater-sized) auditoriums that have been aligned to the same standardized response curve. Aligning both the sound system of the dubbing theatre and the sound system of the public motion picture theatre to the X-curve ensures that a film sounds in the public theatre very similar to the way it sounded in the dubbing theatre, and, in particular, that the timbre of the film sounds neutral (i.e., neither overly bright nor overly dull) in both the dubbing theatre and in the public motion picture theatre.

Although aligning theatre sound systems to the X-curve enables films to sound have a neutral timbre in both the dubbing theatre and the public motion picture theatre, it does not necessarily allow a film to have the same neutral timbre when transferred to another medium, such as a home video tape or disk. This is because the X-curve overcorrects the tendency of a loudspeaker to sound bright in a large room. A large room loudspeaker system aligned to the X-curve therefore sounds dull. Thus, when dubbing the film sound track in a dubbing theatre aligned to the X-curve, the mixing engineer will boost the level of the high-frequency parts of the program material to compensate for the dulling effect of the X-curve aligned dubbing theatre (and also the X-curve aligned public motion picture threatre) so that the timbre of the program material sounds neutral as heard by the mixing engineer in the dubbing theatre. Consequently, motion picture soundtracks inherently carry a built-in high-frequency response boost that takes into account or compensates for playback in large (theater-sized) auditoriums whose loudspeaker-room responses are aligned to the standardized X-curve.

The loudspeaker arrangement in a typical domestic surround sound system mimics that of the motion picture theatre. The outputs of the surround-sound decoder are fed, via suitable power amplifiers, to normal domestic loudspeakers arranged one to the left and one to the right of the video monitor, and to at least two normal domestic loudspeakers arranged behind or to the sides of the main listening/viewing area. Additionally, a center channel signal may be fed to a center channel loudspeaker arranged above or below the video monitor. Although standard in motion picture theater environments, the center loudspeaker is often omitted in home systems. A phantom center sound image is created by feeding the center channel signal equally to the left and right loudspeakers.

One major difference between the home listening environment and the motion picture theater listening environment is in the relative sizes of the rooms—the typical home living room, of course, being much smaller than the typical motion picture theatre. This size difference means that a typical loudspeaker does not sound overly bright in a home living room sized room. Consequently, there is no need to apply the high-frequency rolloff X-curve applicable to large auditoriums to the considerably smaller home living room sized room because of the above-mentioned effects.

Recorded consumer sound media (e.g., vinyl phonograph records, cassette tapes, compact discs, etc.) are monitored when they are made in relatively small (home living room sized) monitoring studios using loudspeakers which are the same or similar to those typically used in homes. In particular, the sound systems used in the mixdown rooms of music recording studios sound relatively neutral, and do not sound dull like the sound systems in film dubbing theatres. Relative to the room-loudspeaker systems in theatres, the response of a typical modern home room-loudspeaker system or a small studio listening room-loudspeaker system can be characterized as substantially neutral, particularly in the high-frequency region in which the X-curve applies excessive rolloff in the large auditorium. A consequence of this is that motion pictures transferred to home video media have too much high frequency sound when reproduced by a home system. Consequently, the musical portions of motion picture soundtracks played on home systems tend to sound "bright." In addition, other undesirable results occur—"Foley" sound effects, such as the rustling of clothing, etc., which tend to have substantial high-frequency content, are over-emphasized. Also, the increased high-frequency output when motion picture soundtracks are played on home systems often reveals details in the makeup of the soundtrack that are not intended to be heard by listeners; for example, changes in soundtrack noise level as dialogue tracks are cut in and out. These same problems, of course, occur when a motion picture soundtrack is played back in any small listening environment having consumer-type loudspeakers, such as small monitoring studios.

It should also be understood that the above remarks regarding motion picture soundtracks generally do not apply to the soundtracks of motion pictures originating in the music industry, for example, music videos. The music industry usually mixes its motion picture soundtracks in small, homesized, studios, so that its soundtracks do not have the timbre errors of soundtracks originating in the film industry.

There is yet another difference between the home sound systems and motion picture theater sound systems that detracts from creating a theater-like experience in the home. It has been the practice at least in certain high-quality theater sound systems to employ loudspeakers that provide a substantially directional sound field for the left, center, and right channels and to employ loudspeakers that provide a substantially non-directional sound field for the surround channel. Such an arrangement enhances the perception of sound localization as a result of the directional front loudspeakers while at the same time enhancing the perception of ambience and envelopment as a result of the non-directional surround loudspeakers.

In contrast, present home surround-sound systems typically employ main channel (left channel, right channel, and, optionally, center channel) loudspeakers designed for use in home audio systems. Some models of such loudspeakers generate a very directional sound field whereas other models of such loudspeakers, equally well regarded for use in home audio systems, generate a very diffuse sound field. The majority of popular loudspeakers designed for use in home audio systems generate a compromise sound field that is neither extremely directional nor extremely non-directional. Surround channel loudspeakers in the home are usually down-sized versions of the main channel loudspeakers and generate sound fields similar to those of the main channel loudspeakers. Thus, the surround channel loudspeakers may generate a very directional sound field, a very diffuse sound field, or something in between. Up to now, little or no attention has been given to the proper selection of directional characteristics for the main channel and surround channel speakers for use in home surround-sound systems.

Also, in both home and theater systems, including the above-mentioned high-quality theater sound systems, no compensation has been employed for the differences in listener-perceived timbre between the main channels and the surround channel. For example, sounds which move from the main channels to the surround channel or vice-versa (sounds "panned" off or onto the viewing screen) undergo timbral shifts. Such shifts in timbre can be so severe as to harm the ability of the listener to believe that the sound is coming from the same sound source as the sound is panned.

The inventor has discovered that the above mentioned equalization standard, currently embodied in ISO 454-1975 (E) of the International Standards Organization, which is a measure of the timbre difference between a direct sound field and a diffuse sound field, cannot be used as a basis to compensate properly for the listener-perceived timbre differences between the main and surround channels.

The inventor believes that there are two main causes for the listen-perceived timbre difference between the main and surround channels. The first cause is comb filter effects. Comb filter effects may arise from using multiple surround loudspeakers to reproduce the same surround sound channel signal, or from deliberately added electronic comb filters used to simulate a surround array with only two loudspeakers. The second cause is frequency response differences due to the human head related transfer function (i.e., the difference between the frequency response measured by a microphone alone and the frequency response measured by a microphone at the bottom of the ear canal, close to the eardrum; the difference being caused by the presence of the head in the sound field and the effects of the pinna and the ear canal). The difference in character between the direct sound field generated by the main channel loudspeakers and the diffuse sound field generated by the surround channel loudspeakers may be an additional factor.

Finally, in both home and theatre systems, including the above-mentioned high quality theater sound systems, a single (monophonic) surround-sound channel is applied to multiple loudspeakers (usually two, in the case of the home, located to the left and right at the sides or rear of a home listening room and usually more than two, in the case of a motion-picture theater, located on the side and rear walls). The result of driving the two sides of the head with the same signal is that the surround-sound channel sounds to a listener seated on the center line as though it were in the middle of the head. It is known that this problem can be reduced by using comb filters to process the signal fed to each surround loudspeaker or group of surround loudspeakers. However, this processing causes timbre changes that exacerbate the timbre difference between the front and surround loudspeakers discussed above, so the use of comb filters to decorrelate the surround loudspeakers is unacceptable, at least in systems that have surround channel timbre correction.

SUMMARY OF THE INVENTION

The invention is directed to improving the accuracy and fidelity of surround sound reproduction systems. The invention is directed primarily to surround-sound reproduction systems in relatively small rooms, particularly those in homes; however, some aspects of the invention apply to rooms of all sizes, from small (home-sized) rooms to large (theatre-sized) auditoriums.

One aspect of the invention solves the problem of soundtrack timbral errors, particularly excessive high-frequency energy, that become noticeable when a soundtrack that has been mixed in a large (theatre-sized) auditorium whose room-loudspeaker system is aligned to a frequency response curve having an excessive significant high-frequency rolloff is played in a small room. In a preferred embodiment, soundtrack timbre correction according to a fixed correction curve determined by the inventor is provided in the home playback system to restore a neutral timbre to motion picture soundtracks having a boosted high-frequency content because they were mixed in large (theater-sized) auditoriums aligned to the X-curve. Such a soundtrack timbre correction enables the timbre intended by the person who originally mixed the soundtrack to be realized when the sound track is played in a small room having a neutral loudspeaker-room response.

In another aspect of the invention directed at small (home-sized) rooms, generally directional sound fields are generated in response to the left and right sound channels and in response to the center sound channel, if used, and a generally non-directional sound field is generated in response to the surround-sound channel.

A directional sound field is one in which the free (direct) component of the sound field is predominant over the diffuse component at listening positions within the room. A nondirectional sound field is one in which the diffuse component of the sound field is predominant over the free (direct) component at listening positions within the room. Directionality of a sound field depends at least on the Q of the loudspeaker or loudspeakers producing the sound field ("Q" is a measure of the directional properties of a loudspeaker), the number of loudspeakers reproducing the same channel of sound, the size and characteristics of the room, the manner in which the loudspeaker (or loudspeakers) is (or are) acoustically coupled to (e.g., positioned with respect to) the room, and the listener's position within the room. For example, multiple high-Q (directional) loudspeakers reproducing the same channel of sound can be distributed so as to produce a non-directional sound field within a room. Also, the directionality of multiple loudspeakers reproducing the same channel of sound can be affected by their physical relationship to one another and differences in amplitude and phase of the signal applied to them.

This aspect of the invention is not concerned per se with specific loudspeakers nor with their acoustic coupling to small rooms, but rather it is concerned, in part, with generating direct sound fields for the main (left, right, and, optionally, center) channels and a diffuse sound field for the surround channel in a small (home-sized) room surround-sound system using whatever combinations of available loudspeakers and techniques as may be required to generate such sound fields. This aspect of the invention recognizes that excellent stereophonic imaging and detail combined with sonic envelopment of the listeners can be achieved not only in large (theater-sized) auditoriums but also in the small (home-sized) room by generating generally direct sound fields for the main channels and a generally diffuse sound field for the surround channel. In this way, the home listening experience can more closely re-create the quality theater sound experience.

In a further aspect of the invention directed to all sizes of room from small (home-sized) rooms to large (theatre-sized) auditoriums, the overall listening impression can be improved even further by adding surround channel timbre correction to compensate for the differences in listener-perceived timbre between the main channels and the surround channel. As mentioned above, the inventor believes that there are two principal causes for listener-perceived timbral differences between the main and surround channels: comb filter effects that arise when more than one loudspeaker reproduces the same channel of sound, and the human head related transfer function.

Comb filter effects can be greatly reduced or substantially suppressed, as described below in connection with the next aspect of the invention, by using only two surround loudspeakers and by decorrelating the surround channel information applied to them. However, because of the need to avoid exacerbating the timbre differences between the surround channel and the main channels, a decorrelation technique having neutral timbre must be employed.

With the timbral differences between the main and surround channels due to comb filter effects removed, as by the next-described aspect of the invention, the human head transfer function related timbre difference between the main and surround channels becomes the most noticeable factor. According to this aspect of the invention, a surround channel timbre correction according to a fixed correction characteristic determined by the inventor is provided in the surround channel of the playback system to eliminate or substantially reduce the difference between the listener-perceived surround channel timbre and the listener-perceived main channel timbre resulting from human head transfer function.

According to the final aspect of the invention, which is applicable to rooms of all sizes, the listener's impression of the surround-sound channel can be improved by decreasing the interaural cross-correlation of the surround-sound channel sound field at listening positions within the room (that is, by "decorrelation"). Decorrelation to prevent the formation of phantom images between pairs of surround loudspeakers fed with the same signal is known, but known methods employ comb filters in the signal path to the surround loudspeakers. Adding comb filters to the surround signal path exacerbates the timbre difference between the main channels and the surround channel described above. Thus, according to this aspect of the invention, decorrelating is accomplished by a technique such as slight pitch shifting between multiple surround loudspeakers, which does not cause undesirable side effects.

While decorrelation may be employed in the surround channel without generating generally direct sound fields for the main channels and a generally diffuse sound field for the surround channel, as described above, combining these aspects of the invention provides an even more psychoacoustically pleasing listening experience. Preferably, the combination further includes the aspect of the invention providing for surround channel timbre correction to compensate for the listener-perceived difference in timbre between main and surround sound channels. This aspect of the invention constitutes the preferred means to reduce combing effects as required by the surround channel timbre correction aspect of the invention.

DETAILED DESCRIPTION OF THE INVENTION

Figure 1:
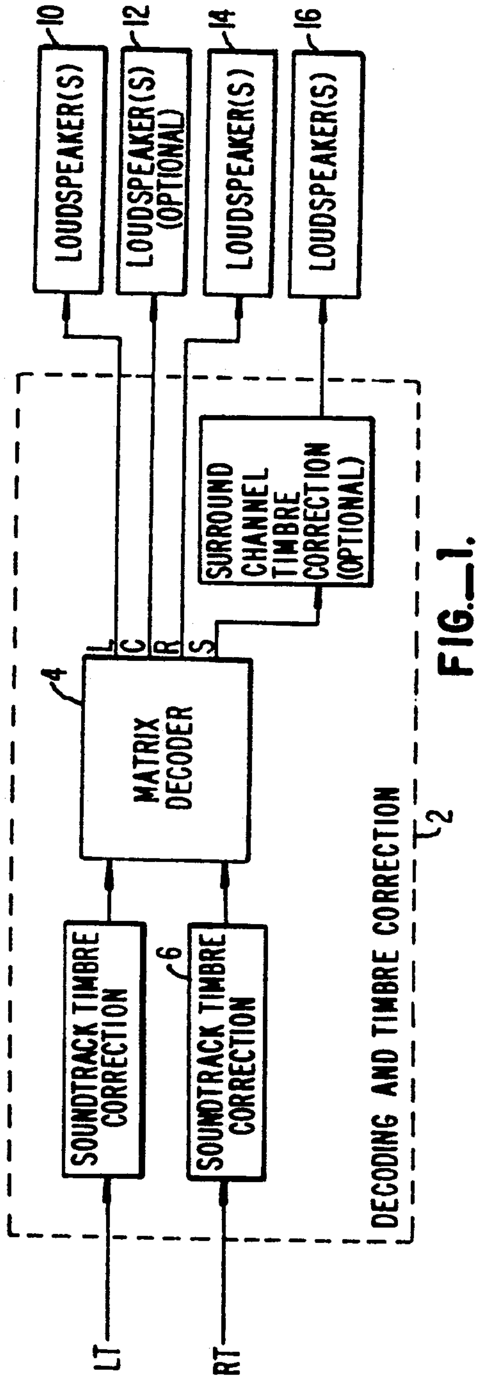
FIG. 1 is a block diagram of a surround-sound reproduction system embodying aspects of the invention.
Figure 2:
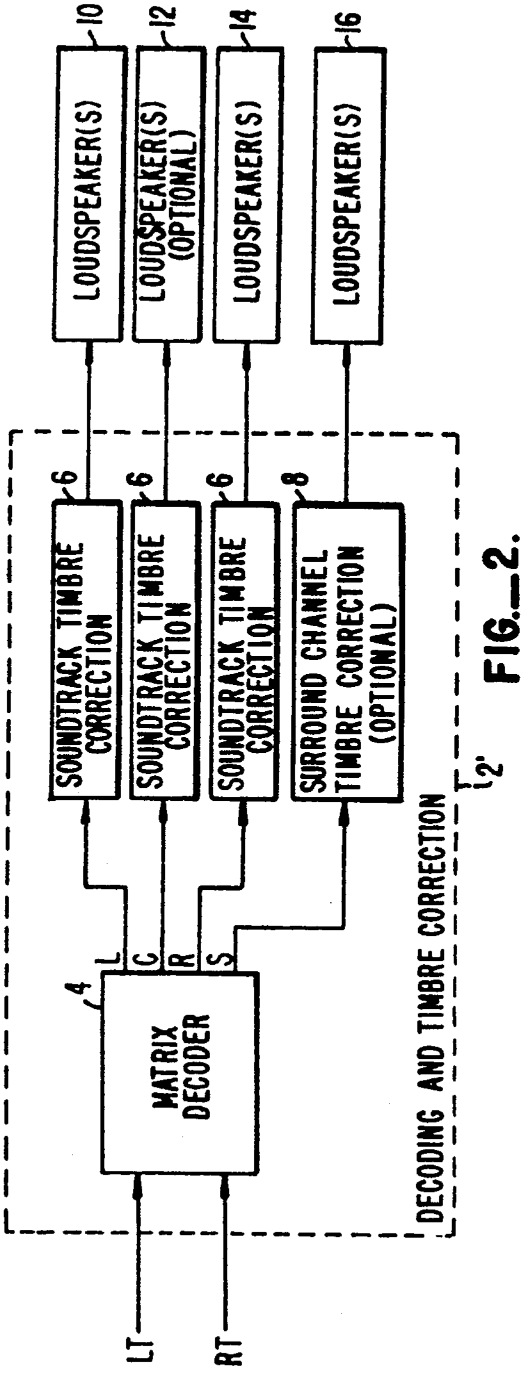
FIG. 2 is a block diagram of a surround-sound reproduction system embodying aspects of the invention.

FIGS. 1 and 2 show, respectively, block diagrams of two surround sound reproduction systems embodying aspects of the invention. FIGS. 1 and 2 are generally equivalent, although, for reasons explained below, the arrangement of FIG. 2 is preferred. Throughout the specification and drawings, like elements generally are assigned the same reference numerals; similar elements are generally assigned the same reference numerals but are distinguished by prime (')-marks.

In both FIGS. 1 and 2, left (L), center (C), right (R), and surround (S) channels, matrix encoded, according to well-known techniques, as left total ($L_T$) and right total $R(_T)$ signals, are applied to decoding and soundtrack timbre correcting means 2 and 2', respectively. Both decoding and soundtrack timbre correcting means 2 and 2' include a matrix decoder that is intended to derive the L, C, R, and S channels from the applied $L_T$ and $R_T$ signals. Such matrix decoders, often referred to as "surround sound" decoders, are well-known. Several variations of surround sound decoders are known both for professional motion picture theater use and for consumer home use. For example, the simplest decoders include only a passive matrix, whereas more complex decoders also include a delay line and/or active circuitry in order to enhance channel separation. In addition, many decoders include a noise reduction expander because most matrix encoded motion picture soundtracks employ noise reduction encoding in the surround channel. It is intended that the matrix decoder 4 include all such variations.

In the embodiment of FIG. 1, soundtrack timbre correcting means 6 are placed in the respective $L_T$ and $R_T$ signal input lines to the matrix decoder 4, whereas in the embodiment of FIG. 2, the soundtrack timbre correcting means 6 are located in the L, C, and R output lines from the matrix decoder 4. The function of the soundtrack timbre correcting means 6 is explained below. In both the FIG. 1 and FIG. 2 embodiments, an optional surround channel timbre correcting means 8 is located in the S output line from the matrix decoder 4. The function of the surround channel frequency response correcting means 8 is also explained below.

In both embodiments, the L, C, R, and S outputs from the decoding and soundtrack timbre correcting means 2 feed a respective loudspeaker or respective loudspeakers 10, 12, 14, and 16. In home listening environments the center channel loudspeaker 12 is frequency omitted (some matrix decoders intended for home use omit entirely a center channel output). Suitable amplification is provided as necessary, but is not shown for simplicity.

The arrangements of both FIGS. 1 and 2 thus provide for coupling at least the left, right, and surround (and, optionally, the center) sound channels encoded in the $L_T$ and $R_T$ signals to a respective loudspeaker or loudspeakers. The loudspeakers are intended to be located in operating positions with respect to a room in order to generate within the room sound fields responsive to at least the left, right, and surround (and, optionally, the center) channels.

Because of the requirement to preserve accurately the relative signal phase of the $L_T$ and $R_T$ input signals for proper operation of the matrix decoder 4, which responds to amplitude and phase relationships in the $L_T$ and $R_T$ input signals, the placement of the soundtrack timbre correcting means 6 (a type of filter, as explained below) before the decoder 4, as in the embodiment of FIG. 1, is less desirable than the alternative location after the decoder 4 shown in the embodiment of FIG. 2. In addition, the soundtrack timbre correcting means 6, if placed before decoder 4, may affect proper operation of the noise reduction expander, if one is employed, in the matrix decoder 4. The arrangement of FIG. 2 is thus preferred over that of FIG. 1. The preferred embodiment of soundtrack timbre correcting means 6 described below assumes that they are located after the matrix decoder 4 in the manner of the embodiment of FIG. 2.

If the soundtrack timbre correcting means 6 are located before the matrix decoder 4 in the manner of FIG. 1 it may be necessary to modify their response characteristics in order to minimize effects on noise reduction decoding that may be included in the matrix decoder 4. It may also be necessary to match carefully the characteristics of the two soundtrack timbre correcting means 6 (of the FIG. 1 embodiment) in order to minimize any relative shift in phase and amplitude in the $L_T$ and $R_T$ signals as they are processed by the soundtrack timbre correcting means 6.

Figure 3:
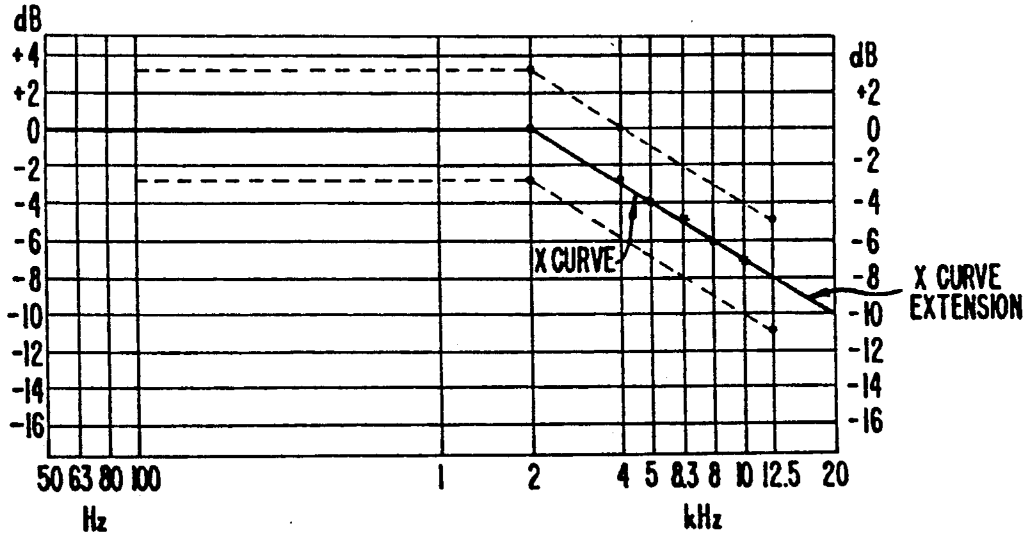
FIG. 3 is a loudspeaker-room response curve used by theaters, curve X of the International Standard ISO 2969-1977(E), extrapolated to 20 kHz.

FIG. 3 shows curve X of the International Standard ISO 2969-1977(E) with the response extrapolated to 20 kHz, beyond the official 12.5 kHz upper frequency limit of the standard. It is common practice in many theaters, particularly dubbing theaters and other theaters equipped with high quality surround sound systems, to align their response to an extended X-curve. The extended X-curve is a de facto industry standard. The X-curve begins to roll off at 2 kHz and is down 7 dB at 10 kHz. The extended X-curve is down about 9 dB at 16 kHz, the highest frequency employed in current alignment procedures for dubbing theaters. In public motion picture theaters, which are larger than dubbing theaters, the X-curve is extended only to 12.5 kHz because the attenuation of high frequency sound by the air becomes a factor above that 12.5 kHz in such large auditoriums.

The X-curve, and particularly its extension, which were originally intended to compensate exactly for the tendency of a loudspeaker to sound overly bright in a large room, are now known to have an excessive rolloff at high frequencies. As a result, a large room sound system aligned to the X-curve (or the extended X-curve), instead of sounding neutral as intended, sounds dull, except when playing program material (such as film soundtracks) that is specifically mixed for playback in such a room. In contrast to an X-curve- or extended X-curve-aligned large room sound system, a good quality modern consumer sound system designed for use in the home, although not aligned to a specific standard, tends not to have a similar excessive high-frequency roll-off. A modern consumer system in a small (home-sized) room may be characterized as sounding relatively neutral at high frequencies.

As explained above, in the creation of a motion picture soundtrack, the soundtrack is usually monitored in a dubbing theater that has been aligned to the extended X-curve, with the expectation that such motion picture films will be played in theaters that have been aligned to that standardized response curve. When creating the soundtrack, the mixing engineer has to boost the high-frequency content of the sound information recorded on the motion picture soundtrack to correct the excessive high-frequency roll-off in theater-sized auditoriums whose loudspeaker-room response is aligned to the X-curve. This results in a timbral error in the sound information recorded on the sound track, but this timbral error enables the soundtrack to sound neutral when played in large rooms aligned to the X-curve. However, for the reasons discussed above, the timbral error in the motion picture soundtrack is audible as an error when the soundtrack is played in home listening environment with a relatively neutral loudspeaker-room response. The motion picture soundtrack transferred to a home video medium has too much high frequency sound energy when reproduced by such a home system. The timbre of the soundtrack sounds incorrect, and details in the sound track can be heard that are not intended to be heard.

According to one aspect of this invention, soundtrack timbre correction is provided to correct the boosted high-frequency content of motion picture soundtracks when such soundtracks are played back in small rooms. The soundtrack timbre correction characteristic was empirically derived using a specialized commercially-available acoustic testing manikin. The acoustic testing manikin was used to measure the steady-state one-third octave sound level spectrum of several representative extended X-curve-aligned large auditoriums, and of a good quality modern home consumer loudspeaker-room sound system. The soundtrack timbre correction characteristic represents the difference between these two sets of measurements.

Figure 4:
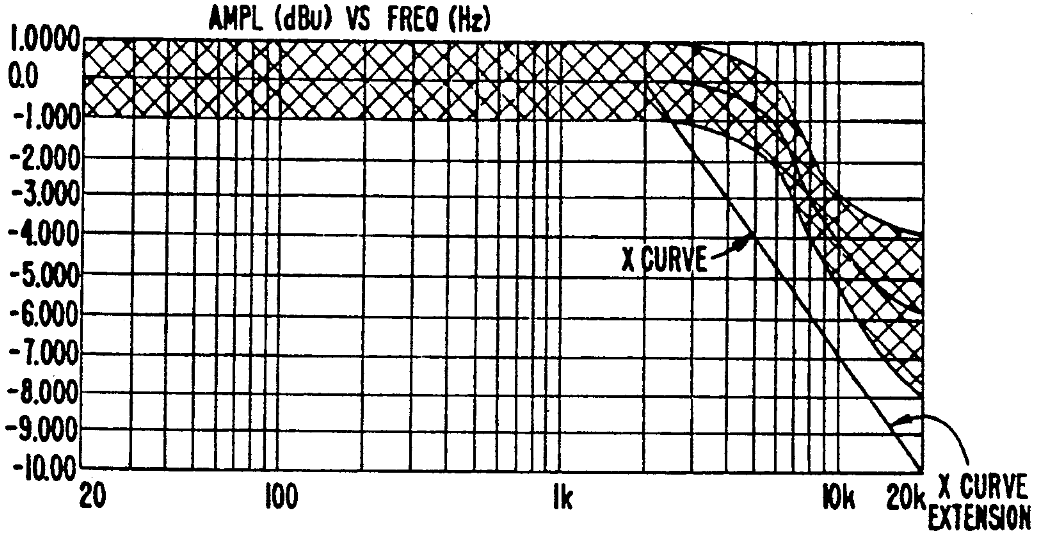
FIG. 4 is a correction characteristic, according to one aspect of this invention, to correct the timbral imbalance apparent in motion picture soundtracks when such soundtracks are played back in small rooms.

The correction characteristic is shown in FIG. 4 as a cross-hatched band centered about a solid line central response characteristic. The soundtrack timbre correction band takes into account an allowable tolerance in the correction of about $\pm 1$ dB up to about 10 kHz and about $\pm 2$ dB from about 10 kHz to 20 kHz, where the ear is less sensitive to variation in response. In practice, the tolerance for the initial flat portion of the characteristic, below about 2 kHz, may be tighter. The form of the soundtrack timbre correction characteristic is generally that of a low-pass filter with a shelving response: the characteristic is relatively flat up to about 4 to 5 kHz, exhibits a steep rolloff, and begins to flatten out above about 10 kHz. About 3 to 5 dB rolloff is provided at 10 kHz. The extended X-curve response is also shown in FIG. 4 for reference.

It will be appreciated that the optimum correction characteristic would change (or be eliminated altogether) if a modified X-curve standard were adopted and put into practice.

Figure 5:
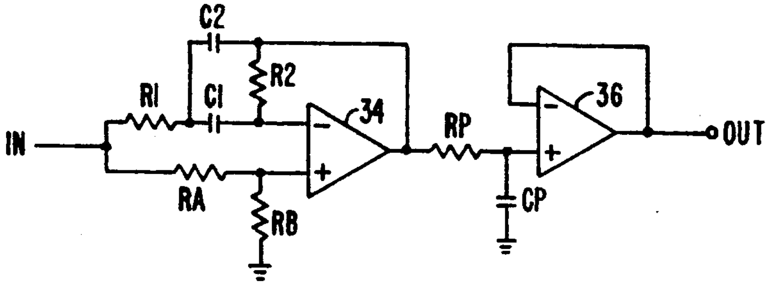
FIG. 5 is a schematic circuit diagram showing the preferred embodiment of a filter circuit for implementing the correction characteristic of FIG. 4.

A filter circuit can be implemented by means of an active filter, such as shown in FIG. 5, to provide a transfer characteristic closely approximating the solid central line of the correction curve band of FIG. 4. The correct frequency response for the filter is obtained by the combination of a simple real pole and a "dip" filter section. The real pole is realized by a single RC filter section with a −3 dB frequency of 15 kHz. The dip filter is a second order filter with a nearly flat response. The transfer function of the section is:

$$\frac{s^2 + \gamma\frac{\omega_0}{Q} + \omega_0^2}{s^2 + \frac{\omega_0}{Q} + \omega_0^2}$$

The complex pole pair and the complex zero pair have the same radian frequency but their angles are slightly different giving the desired dip in the frequency response with minimum phase shift. The same dip could be achieved with the zeros in the right half plane, but the phase shift would be closer to that of an allpass filter—180 degrees at the resonant frequency. The parameters of the dip section in the filter are:

$f_0 = 12.31$ kHz $Q = 0.81$ $\gamma = 0.733$ where $f_0 = 2\pi\omega_0$. Another way of interpreting these parameters is that the Q of the poles is 0.81 and the Q of the zeros is $$\frac{0.81}{\gamma}.$$

The dip section can be realized by a single operational amplifier filter stage and six components as shown in FIG. 5. The filter stage in effect subtracts a bandpass filtered signal from unity giving the required transfer function and frequency response shape. The circuit topology, one of a class of single operational amplifier biquadratic circuits, is known for use as an allpass filter (PASSIVE AND ACTIVE NETWORK ANALYSIS AND SYNTHESIS by Aram Budak, Houghton Mifflin Company, Boston, 1974, page 451).

The rectangular coordinates of the poles and zeros of the overall filter are as follows (units are radians/sec in those locations on the s-plane):

Real Pole:

$$\alpha_{rp} = -9.4248\times10^4$$

Complex Poles:

$$\alpha_p \pm j\beta_p = -4.7046\times10^4 \pm j5.9962\times10^4$$

Complex Zeroes:

$$\alpha_z \pm j\beta_z = -3.4485\times10^4 \pm j6.7967\times10^4$$

Figure 6:
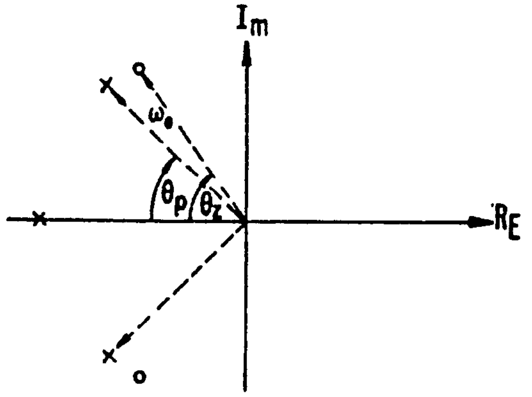
FIG. 6 is a diagram in the frequency domain showing the locations of the poles and zeros on the s-plane of the filter of FIG. 5.

FIG. 6 shows the location of the poles and zeros on the s-plane.

When implemented with the preferred component values listed below, the resulting characteristic response of the filter circuit of FIG. 5 is:

| Hz | dB |
|---|---|
| 20 | 0.0 |
| 100 | 0.0 |
| 500 | 0.0 |
| 1k | 0.0 |
| 2k | −0.2 |
| 3k15 | −0.4 |
| 4k | −0.7 |
| 5k | −1.1 |
| 6k3 | −1.8 |
| 8k | −2.8 |
| 10k | −4.2 |
| 12k5 | −5.2 |
| 16k | −5.4 |
| 20k | −5.7 |

As mentioned above, there is an allowable tolerance of about ±1 dB up to about 10 kHz and about ±2 dB from about 10 kHz to 20 kHz. The preferred component values of the circuit shown in FIG. 5 are as follows:

| Component | 5% tolerance | 1% tolerance |
|---|---|---|
| R1 | 6k8 | 6k81 (6.81 kilohms) |
| R2 | 18k | 17k4 |
| C1 = C2 | 1n2 | 1n2 (1.2 nanofarads) |
| RA | 2k2 | 2k00 |
| RB | 10k | 10k0 |
| RP | 4k7 | 4k87 |
| CP | 2n2 | 2n2 |

The filter circuit of FIG. 5 is one practical embodiment of the soundtrack timbre correcting means 6 of FIG. 2. Many other filter circuit configurations are possible within the teachings of the invention.

Referring again to the embodiments of FIGS. 1 and 2, the loudspeaker or loudspeakers 10, 12 (if used), and 14 are preferably directional loudspeakers that generate, when in their operating positions in the room, left, center (if used), and right channel sound fields in which the free (direct) sound field component is predominant over the diffuse sound field component of each sound field at listening positions within the room. The loudspeaker or loudspeakers 16 is (or are) preferably non-directional so as to generate, when in its or their operating positions in the room, a surround channel sound field in which the diffuse sound field component is predominant over the free (direct) sound field component at listening positions within the room.

A non-directional sound field for reproducing the surround channel can be achieved in various ways. Preferably, one or more dipole type loudspeakers each having a generally figure-eight radiation pattern are oriented with one of their respective nulls generally toward the listeners. Other types of loudspeakers having a null in their radiation patterns can also be used. Another possibility is to use a multiplicity of speakers having low directivity arranged around the listeners so as to create an overall sound field that is diffuse. Thus, depending on their placement in the room and their orientation with respect to the listening positions, even loudspeakers having some directivity are capable of producing a predominantly diffuse sound field.

In order to obtain the full sonic benefits of directional and non-directional speakers as just set forth, it is preferred that the arrangements of the FIG. 1 and FIG. 2 embodiments use the optional surround channel timbre correcting means 8. This correction compensates for the differences in listener-perceived timbre between the main and surround channels.

The following table shows the data for implementing the characteristic response of the desired correction to compensate for the listener-perceived timbre difference between the main and surround channels. The correction characteristic was empirically derived using a specialized commercially-available acoustic testing manikin to measure the steady-state one-third octave sound level spectrum of a loudspeaker in a small room. One set of data was measured with the loudspeaker placed in front of the manikin and a second set of data was measured with the loudspeaker placed to the side of the manikin. The two loudspeaker positions approximate the locations of the center and surround loudspeakers in a surround sound system. A further two sets of data were measured with an instrumentation microphone substituted for the acoustic testing manikin. The differences between the respective measurement microphone data and manikin data were subtracted to eliminate the effects of the specific room and loudspeaker. The correction characteristic was then derived by determining the difference between the corrected front data and the corrected side data.

| Hz | dB |
|---|---|
| 1000 | 0.0 |
| 1163 | −1.5 |
| 1332 | −2.4 |
| 1525 | −2.2 |
| 1746 | −1.7 |
| 2000 | −1.3 |
| 2290 | −2.6 |
| 2622 | −2.7 |
| 3002 | −3.2 |
| 3438 | −5.0 |
| 3936 | −4.3 |
| 4507 | −2.8 |
| 5161 | −2.3 |
| 5910 | −4.2 |
| 6767 | −5.8 |
| 7749 | −5.6 |
| 8873 | −3.6 |
| 10161 | −1.8 |
| 11634 | −2.0 |
| 13322 | 0.0 |
| 15254 | +0.5 |
| 17467 | +1.4 |
| 20000 | −1.0 |

There is an allowable tolerance of about of about ±2 dB up to about 10 kHz and about ±4 dB from about 10 kHz to 20 kHz.

Figure 7:
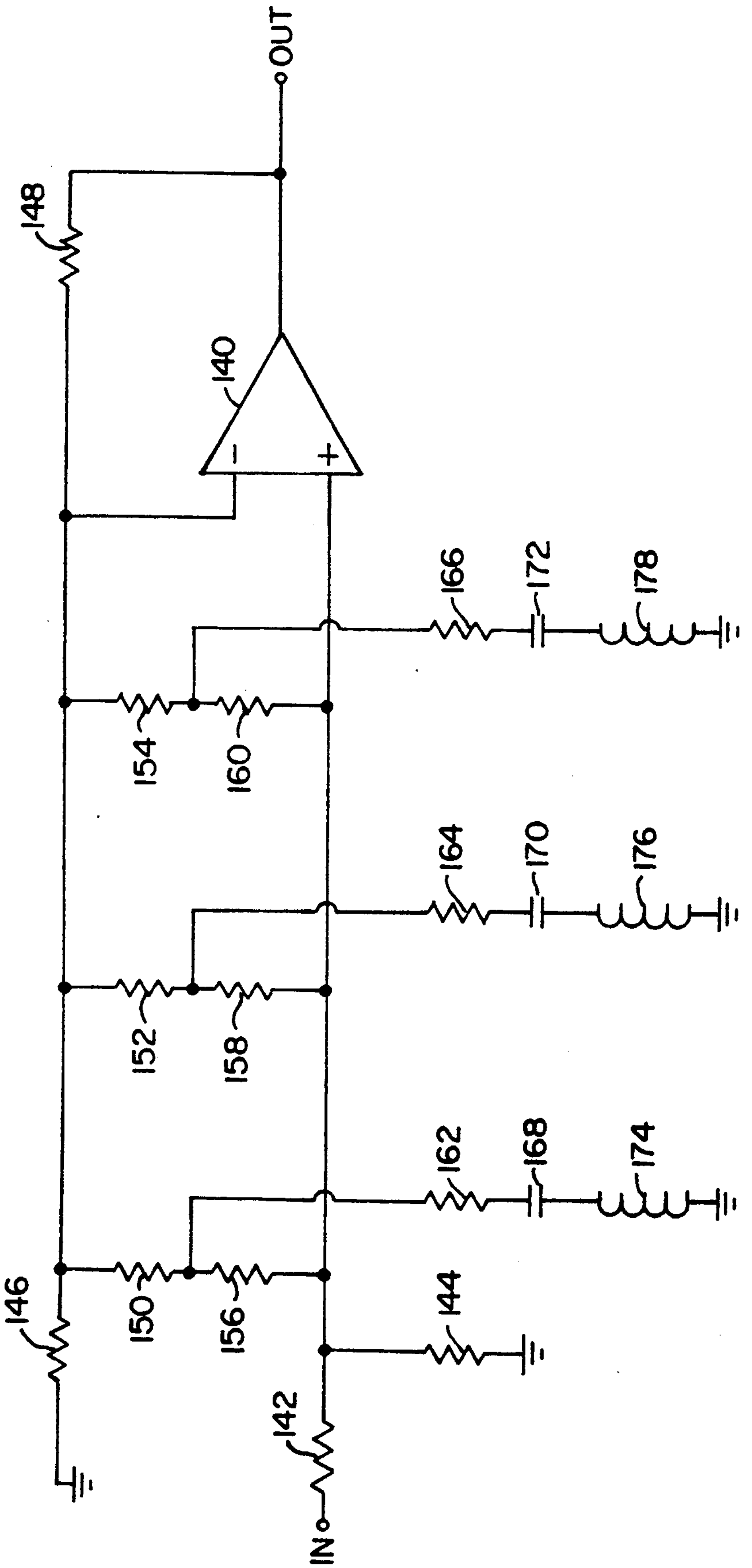
FIG. 7 is a schematic circuit diagram showing the preferred embodiment of a surround channel timbre correction circuit for implementing the characteristic response of the desired correction to compensate for the listener-perceived timbre difference between the main and surround channels.

The preferred embodiment of the surround channel timbre correcting means 8, described below in connection with FIG. 7, is an active filter circuit that substantially implements (within about 1 dB) the correction data set forth in the table just above. It will be noted that the correction data extends up to 20 kHz even though the frequency response of the surround channel in the standard matrix surround sound system is limited to about 7 kHz by a low-pass filter. The surround channel timbre correction circuit described in connection with FIG. 7 is intended for applications in which a 7 kHz low-pass filter is not present in the surround channel. In practical applications where the 7 kHz low-pass filter is present, it is preferred that the overall transfer function of the surround channel timbre correcting means 8 and the low-pass filter combine so as to substantially implement the correction data to the extent possible in view of the high-frequency rolloff of the low-pass filter. The design and implementation of such a surround channel timbre correction circuit is well within the ordinary skill in the art.

FIG. 7 shows a schematic diagram of a practical embodiment of surround channel timbre correcting means 8 that implements (within about 1 dB) the correction data set forth in the table above. Surround channel timbre correcting means 8 is embodied in a three-section resonant active filter circuit. The circuit has a single operational amplifier 140 configured as a differential amplifier with frequency-dependent impedances between its positive and negative-going inputs. The impedances are each tuned series LCR circuits connected between the midpoint of respective voltage divider resistors and a reference ground. The preferred component values of the circuit shown in FIG. 7 are as follows:

| Component | Value |
|---|---|
| 142 | 10k ohms |
| 144 | 10k |
| 146 | 10k |
| 148 | 10k |
| 150 | 2k2 (2.2 kohms) |
| 152 | 4300 |
| 154 | 1k8 |
| 156 | 1250 |
| 158 | 1200 |
| 160 | 2k0 |
| 162 | 1k0 |
| 164 | 1k0 |
| 166 | 1k0 |
| 168 | 10n (nanofarads) |
| 170 | 9n |
| 172 | 5n |
| 174 | 300m (millihenries) |
| 176 | 75m |
| 178 | 150m |

The filter circuit of FIG. 7 is one practical embodiment of surround channel timbre correcting means 8 of FIGS. 1 and 2. Many other filter circuit configurations are possible within the teachings of the invention.

In a modification of the embodiments of FIGS. 1 and 2, the monophonic surround-sound channel advantageously may be split, by appropriate decorrelating means, into two channels which, when applied to first and second surround loudspeakers or groups of loudspeakers, provide two surround channel sound fields having low-interaural cross-correlation with respect to each other at listening positions within a small (home-sized) room. Preferably, each of the two decorrelated surround channel sound fields is generated by a single loudspeaker and those two loudspeakers are located, respectively, at the sides of the room. Alternatively, the two loudspeakers may be located at the rear of the room. The use of more than a single loudspeaker to generate each field makes it more difficult to match the timbre of the surround channel sound field to that of the main (left, center, and right) channel sound fields. This as believed to be the result of a comb filter effect produced when more than two loudspeakers are used to generate each of the decorrelated surround channel sound fields. As mentioned above, this aspect of the invention is particularly useful in combination with the surround channel timbre correction aspect of the invention, which requires the comb filter effects be reduced or substantially suppressed.

It has previously been established that human perception favors dissimilar sound present at the two ears insofar as the reverberant energy in a room is concerned. In order to provide such a dissimilarity when using matrix audio surround-sound technology, added circuitry is needed beyond simple encoding and decoding, since only a monaural surround track is encoded. In principle this circuitry may employ various known techniques for synthesizing stereo from a monaural source, such as comb filtering. However, many of these techniques produce undesirable audible side effects. For example, comb filters suffer from audible "phasiness," which can readily be distinguished by careful listeners. In addition, electronic comb filtering is undesirable because it contributes to listener-perceived timbre differences between the main and surround channels. Thus, a decorrelator with neutral timbre is preferable.

Preferably, the decorrelation circuitry used in the practical embodiment of this aspect of the invention employs small amounts of frequency or pitch shifting, which is known to be relatively unobtrusive to critical listeners, and is timbre neutral. Pitch shifting, for example, is currently used, besides as an effect, to allow the increase of gain before feedback in public address systems, where it is not easily noticed, the amount of such shifts being small, in the order of a few Hertz. A 5 Hz shift is employed in a modulation-demodulation circuit for this purpose described in A Frequency Shifter for Improving Acoustic Feedback Stability, by A. J. Prestigiacomo and D. J. MacLean, reprinted in SOUND REINFORCEMENT, AN ANTHOLOGY, Audio Engineering Society, 1978, pp. B-6-B-9.

Frequency or pitch shifting may be accomplished by any of the well-known techniques for doing so. In addition to the method described in the Prestigiacomo and MacLean article, as noted in the HANDBOOK FOR SOUND ENGINEERS, THE NEW AUDIO CYCLOPEDIA, Howard W. Sams & Co. First Edition, 1987, page 626, delay can form the basis for frequency shift: the signal is applied to the memory of the delay at one rate (the original frequency) and read out at a different rate (the shifted frequency).

The surround channel signal is applied to two paths. At least one path is processed by a pitch shifter. Preferably, the frequency or pitch shift is fixed and is small, sufficient to psychoacoustically decorrelate the sound fields without audibly degrading the sound: in the order of a few Hertz. Although more complex arrangements are possible, they may not be necessary. For example, pitch shifting could be provided in both paths and the pitch could be shifted in a complementary fashion, with one polarity of shift driving the surround channel signal in one path up in frequency, and the other driving the signal in the other path downward in frequency. Other possibilities include varying the pitch shift by varying the clocking of a delay line. The shift could be varied in accordance with the envelope of the surround channel audio signal (e.g., under control of a circuit following the surround channel audio signal having a syllabic time constant—such circuits are well known for use with audio compressors and expanders).

Although either analog or digital delay processing may be employed, the lower cost of digital delay lines suggests digital processing, particularly the use of adaptive delta modulation (ADM) for which relatively inexpensive decoders are available. Conventional pulse code modulation (PCM) also may be used. Although waveform discontinuities ("splices") occur at the signal block sample junctions as the output signal from the delay line is reconstructed whether ADM or PCM is used, such splices tend to be inaudible in the case of ADM because the errors are single bit errors. In the case of PCM, special signal processing is likely required to reduce the audibility of the splices. According to the above cited HANDBOOK FOR SOUND ENGINEERS, several signal-processing techniques have successfully reduced the audibility of such "splices."

Figure 8:
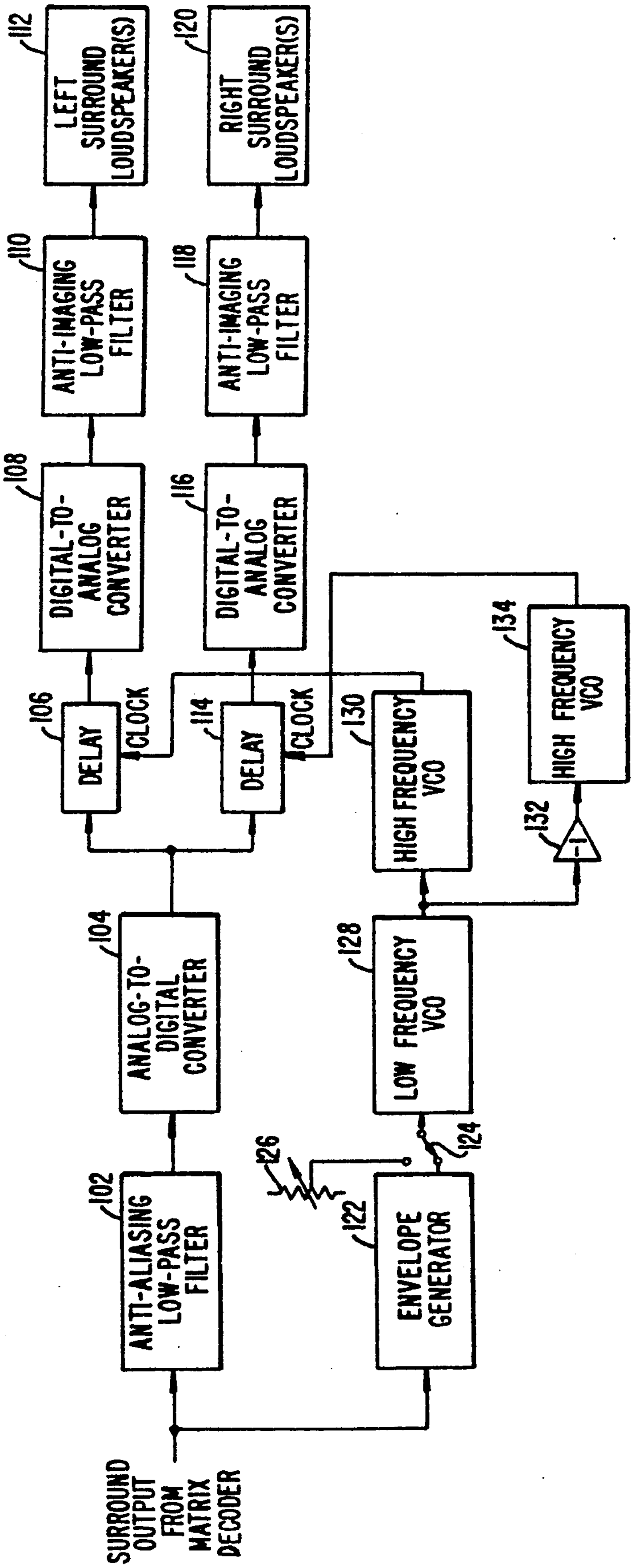
FIG. 8 is a block diagram showing an arrangement for deriving, by means of pitch shifting, two sound outputs from the surround-sound channel capable of providing, according to another aspect of the invention, sound fields having low-interaural cross-correlation.

Referring to FIG. 8, the surround output from matrix decoder 4 (optionally, via surround channel timbre correcting means 8) of FIGS. 1 or 2 provides the input to the decorrelator which is applied to an anti-aliasing low-pass filter 102 in the signal processing path and to an envelope generator 122 in the control signal path. The filtered input signal is then applied to an analog-to-digital converter (preferably, ADM) 104, the digital output of which is applied to two paths that generate, respectively, the left surround and right surround outputs. The assignment of the "left" and "right" paths is purely arbitrary and the designations may be reversed. The paths are the same and include a clocked delay line 106 (114), a digital-to-analog converter 108 (116) and an anti-imaging low-pass filter 110 (118).

The control signal for controlling the pitch shift by means of altering the clocking of the delay lines 106 and 114 is fixed or variable, according to the position of switch 124, which selects the input to a very low frequency voltage controlled oscillator (VCO) 128 either from the envelope generator 122, which follows the syllabic rate of the surround channel audio signal, or from a fixed source, shown as a variable resistor 126. VCO 128 operates at a very low frequency, less than 5 Hz. The output of the low frequency VCO 128 is applied directly to a high frequency VCO 130 which clocks delay line 106 in the left surround path and is also inverted by inverter 132 for application to a second high frequency VCO 134 which clocks delay line 114 in the right surround path. When there is no output from the low frequency VCO 128, the two high frequency VCOs are set to the same frequency (in the megahertz range, the exact frequency depending on the clock rate required for the delay lines, which in turn depends on the digital sampling rate selected). The low frequency oscillator 128 modulates the high frequency oscillators, producing complementary pitch shifts.

Alternatively, the decorrelator of FIG. 8 may be simplified so that the surround output from the matrix decoder is applied without processing in a first path to either the left surround loudspeaker(s) 112 or right surround loudspeaker(s) 120. The other path is applied to the other of the loudspeaker(s) via frequency or pitch shift processing, preferably fixed, including anti-aliasing low-pass filter 102, analog-to-digital converter 104, delay 106, digital-to-analog converter 108, anti-imaging low-pass filter 110. Delay 106 is controlled as shown in FIG. 8, preferably with switch 124 selecting the fixed input from potentiometer 126. The amount of frequency shifting required in this variation in which the pitch is shifted only in one channel is about twice that provided to each of the paths in the embodiment of FIG. 8.

The output of the paths is applied (through suitable amplification), respectively, to one (preferably) or a group of left surround loudspeakers 112 and to one (preferably) or a group of right surround loudspeakers 120. The loudspeakers should be arranged so that they generate first and second sound fields generally to the left (side and/or rear) and right (side and/or rear) of listening positions within the room. The techniques mentioned above for generating a predominantly diffuse sound field are preferably applied to the decorrelated surround.

I claim:

1. A sound system for reproducing a motion picture soundtrack in a relatively small room, such as in a home, wherein said motion picture soundtrack is equalized for playback in a room whose room-loudspeaker system is aligned to the standard motion picture theater X-curve, comprising loudspeaker means for generating, when located in its operating positions with respect to the room, in response to an input signal, at least one sound field at listening positions within the room, means for coupling, including means for coupling a signal derived from the soundtrack as the input signal to the loudspeaker means, the means for coupling including soundtrack timbre correcting means for changing the frequency response of the signal derived from the motion picture soundtrack to compensate for said X-curve equalization.

2. The sound system of claim 1 for reproducing a motion picture soundtrack, the motion picture soundtrack having a plurality of sound channels, including a surround sound channel, wherein the loudspeaker means includes surround loudspeaker means for generating, when located in its or their operating positions with respect to the room, in response to a surround input signal, a surround sound field at listening positions within the room, and the means for coupling also includes means for coupling a signal derived from the surround sound channel as the surround input signal to the surround loudspeaker means.

3. The system of claim 1 for reproducing a motion picture soundtrack, the motion picture soundtrack having a plurality of sound channels, including left and right sound channels, wherein the loudspeaker means generates, when located in its or their operating positions with respect to the room, in response to first and second input signals, first and second sound fields at listening positions within the room, the means for coupling includes means for coupling a signal derived from the left sound channel as the first signal to the loudspeaker means, and means for coupling a signal derived from the right sound channel as the second input signal to the loudspeaker means, and the soundtrack timbre correcting means changes the frequency response of the signals derived from the left sound channel and right sound channel to compensate for said X-curve equalization.

4. The sound system of claim 3 for reproducing a motion picture soundtrack having a plurality of sound channels, the motion picture soundtrack additionally including a surround sound channel, wherein the loudspeaker means includes additional loudspeaker means for generating, when located in its or their operating positions with respect to the room, in response to a surround input signal, a surround sound field at listening positions within the room, and the means for coupling also includes means for coupling a signal derived from the surround sound channel as the surround input signal to the surround loudspeaker means.

5. The sound system of claim 4 for reproducing a motion picture soundtrack, the motion picture soundtrack having a plurality of sound channels carried in left total and right total signals, wherein the means for coupling further includes decoding means for generating left, right, and surround sound channel signals in response to the left total and right total signals.

6. The sound system of claim 5 wherein the decoding means processes the left total and right total input signals and the soundtrack timbre correcting means processes the multiple sound channel outputs of the decoding means.

7. The sound system of claim 3 for reproducing a motion picture soundtrack, the motion picture soundtrack having a plurality of sound channels, additionally including a center sound channel, wherein the loudspeaker means generates, when located in its or their operating positions with respect to the room, in response to a further input signal, a further sound field at listening positions within the room, and the means for coupling also including means for coupling a signal derived from the center sound channel as the further input signal to the loudspeaker means, the soundtrack timbre correcting means changes the frequency response of the signal derived from the center sound channel to compensate for said X-curve equalization.

8. The sound system of claim 7 for reproducing a motion picture soundtrack, the motion picture soundtrack having a plurality of sound channels carried in left total and right total signals, and the means for coupling further includes decoding means for generating signals for the left, right, and center sound channels in response to the left total and right total signals.

9. The sound system of claim 8 wherein the decoding means processes the left total and right total input signals and the soundtrack timbre correcting means processes the multiple sound channel outputs of the decoding means.

10. The sound system of claim 7 for reproducing a motion picture soundtrack, the motion picture soundtrack having a plurality of sound channels additionally including a surround sound channel, wherein the loudspeaker means includes additional loudspeaker means for generating, when located in its or their operating positions with respect to the room, in response to a surround input signal, a surround sound field at listening positions within the room, and the means for coupling includes means for coupling a signal derived from the surround sound channel as the surround input signal to the additional loudspeaker means.

11. The sound system of claim 10 for reproducing a motion picture soundtrack, the motion picture soundtrack having a plurality of sound channels carried in left total and right total signals, wherein the means for coupling further includes decoding means for generating signals for the left, center, right, and surround sound channels in response to the left total and right total signals.

12. The sound system of claim 11 wherein the decoding means processes the left total and right total input signals and the soundtrack timbre correcting means processes the multiple sound channel outputs of the decoding means.

13. The sound system of claims 4, 5, 10, or 11 wherein the additional loudspeaker means includes first and second additional loudspeaker means, said first and second additional loudspeaker means when located in their operating positions with respect to the room and reproducing said surround channel developing a comb filter effect, and the means for coupling a signal derived from the surround sound channel to the additional loudspeaker means further includes decorrelating means for deriving from the surround sound channel two surround signals decorrelated with respect to each other and for applying said two surround signals to said first and second additional loudspeaker means, respectively, thereby reducing the comb filter effect that would otherwise occur when said first and second additional loudspeaker means reproduce said surround sound channel.

14. The sound system of claim 13 wherein the decorrelating means has neutral timbre.

15. A sound system for reproducing a motion picture soundtrack having a plurality of sound channels, including left, right, and surround sound channels, in a relatively small room, such as in a home, wherein said motion picture soundtrack is equalized for playback in a room whose room-loudspeaker system is aligned to the standard motion picture theater X-curve, comprising loudspeaker means for generating, when located in its or their operating positions with respect to the room, in response to first and second input signals, first and second sound fields each having direct and diffuse sound field components in which the direct sound field component of each sound field is predominant over the diffuse sound field component at listening positions within the room, additional loudspeaker means for generating, when located in its or their operating positions with respect to the room, in response to a third input signal, a third sound field having direct and diffuse sound field components in which the diffuse sound field component is predominant over the direct sound field component at listening positions within the room, and means for coupling, including means for coupling a signal derived from the left sound channel as the first input signal to the loudspeaker means, means for coupling a signal derived from the right sound channel as the second input signal to the loudspeaker means, the means for coupling signals derived from the left and right sound channels to the loudspeaker means including soundtrack timbre correcting means for changing the frequency response of signals derived from the left sound channel and the right sound channel to compensate for said X-curve equalization, and means for coupling a signal derived from the surround sound channel as the surround input signal to the additional loudspeaker means.

16. The sound system of claim 15 for reproducing a motion picture soundtrack having a plurality of sound channels, said motion picture soundtrack additionally including a center sound channel, wherein the loudspeaker means generates, when located in its or their operating positions with respect to the room, in response to a further input signal a fourth sound field having direct and diffuse sound field components in which the direct sound field component of the sound field is predominant over the diffuse sound field component at listening positions within the room, and the means for coupling also includes means for coupling a signal derived from the center sound channel, as the further input signal, to the loudspeaker means, the means for coupling the signal derived from the center sound channel to the loudspeaker means including soundtrack timbre correcting means for changing the frequency response of the center sound channel to compensate for said X-curve equalization.

17. The sound system of claim 16 wherein the additional loudspeaker means includes first and second additional loudspeaker means, said first and second additional loudspeaker means when located in their operating positions with respect to the room and reproducing said surround channel developing a comb filter effect, and the means for coupling a signal derived from the surround sound channel to the additional loudspeaker means further includes decorrelating means for deriving from the surround sound channel two surround signals decorrelated with respect to each other and for applying said two surround signals to said first and second additional loudspeaker means, respectively, thereby reducing the comb filter effect that would otherwise occur when said first and second additional loudspeaker means reproduce said surround sound channel.

18. The sound system of claim 17 wherein the decorrelation means has neutral timbre.

19. The sound system of claims 15, 16, or 17 wherein the loudspeaker means reproducing, respectively, said plurality of sound channels, when located in their operating positions with respect to the room, generate sound fields which result in listener-perceived differences in timbre between the main and surround channel sound fields, said means for coupling a signal derived from the surround sound channel to the additional loudspeaker means including surround sound channel timbre correcting means for changing the frequency response of the surround sound channel to correct the listener-perceived difference in timbre between the surround sound channel and the other sound channels.

20. A sound system for reproducing a motion picture soundtrack having a plurality of sound channels, including a front sound channel and a surround sound channel, in a room, comprising loudspeaker means for generating, when located in its or their operating positions with respect to the room, in response to an input signal, a front sound field disposed generally in front of listening positions within the room, additional loudspeaker means for generating, when located in its or their operating positions with respect to the room, in response to a surround input signal, a surround sound field disposed generally to the sides of listening positions within the room, said loudspeaker means, when located in its or their operating positions with respect to the room, and said additional loudspeaker means, when located in its or their operating positions with respect to the room, generate sound fields which result in listener-perceived differences in timbre between the front and surround sound fields, and means for coupling including means for coupling a signal derived from the front sound channel as the input signal to the loudspeaker means, and means for coupling a signal derived from the surround sound channel as the surround input signal to the additional loudspeaker means, the means for coupling a signal derived from the surround channel to the additional loudspeaker means including surround sound channel timbre correcting means for changing the frequency response of the surround channel to correct the listener-perceived difference in timbre between the surround sound channel and the front sound channel, wherein said coupling means corrects the listener-perceived difference in frequency response substantially in accordance with a correction characteristic corresponding to a characteristic representing the difference between the steady-state sound level spectra between a front loudspeaker position and a side loudspeaker position, measurements of said spectra derived using an acoustic testing manikin and a measurement microphone, differences between measurement microphone and manikin data having been subtracted to eliminate the effects of the specific room and loudspeaker characteristics.

21. The sound system of claim 20 wherein in the front sound field, the sound field has direct and diffuse sound field components and the direct sound field component is predominant over the diffuse sound field component, and in the surround sound field, the sound field has direct and diffuse sound field components and the diffuse sound field component is predominant over the direct sound field component.

22. The sound system of claims 20 or 21 wherein the surround sound channel when reproduced by a plurality of loudspeaker means develops a comb filter effect, said timbre correcting means including decorrelating means for reducing the comb filter that would otherwise occur when the surround channel is reproduced by a plurality of loudspeaker means.

23. The sound system of claim 22 wherein the decorrelating means has neutral timbre.

24. The sound system of claim 22, wherein said motion picture soundtrack is equalized for playback in a room whose room-loudspeaker system is aligned to the standard motion picture theater X-curve, wherein the means for coupling the front sound channel to the loudspeaker means includes soundtrack timbre correcting means for changing the frequency response of the front sound channel to compensate for said X-curve equalization.

25. The sound system of claim 20 for reproducing a motion picture sound track, the motion picture soundtrack having a front sound channel comprising a left sound channel and a right sound channel, wherein the front sound field comprises a first sound field and a second sound field, the loudspeaker means generating the first and second sound fields in response to first and second input signals, and the means for coupling a signal derived from the front sound channel as the input signal to the loudspeaker means includes means for coupling a signal derived from the left sound channel as the first input signal to the loudspeaker means, and means for coupling a signal derived from the right sound channel as the second input signal to the loudspeaker means.

26. The sound system of claim 25 wherein in the front sound field, the sound field has direct and diffuse sound field components and the direct sound field component is predominant over the diffuse sound field component, and in the surround sound field, the sound field has direct and diffuse sound field components and the diffuse sound field component is predominant over the direct sound field component.

27. The sound system of claims 25 or 26 wherein the surround sound channel when reproduced by a plurality of loudspeaker means develops a comb filter effect, said timbre correcting means including decorrelating means for reducing the comb filter effect that would otherwise occur when the surround channel is reproduced by a plurality of loudspeaker means.

28. The sound system of claim 27, wherein said motion picture soundtrack is equalized for playback in a room whose room-loudspeaker system is aligned to the standard motion picture theater X-curve, wherein the means for coupling signals derived from the left and right sound channels to the loudspeaker means includes soundtrack timbre correcting means for changing the frequency response of the signals derived from the left and right sound channels to compensate for said X-curve equalization.

29. The sound system of claim 25 for reproducing a motion picture soundtrack, the motion picture soundtrack having a front sound channel additionally comprising a center sound channel, wherein the front sound field additionally comprises a further sound field, the loudspeaker means generating the further sound field in response to a further input signal, and the means for coupling a signal derived from the front sound channel further includes means for coupling a signal derived from the center sound channel as the further input signal to the loudspeaker means.

30. The sound system of claim 29 wherein in the further sound field, the sound field has direct and diffuse sound field components and the direct sound field component is predominant over the diffuse sound field component, and in the surround sound field, the sound field has direct and diffuse sound field components and the diffuse sound field component is predominant over the direct sound field component.

31. The sound system of claims 29 or 30 wherein the surround sound channel when reproduced by a plurality of loudspeaker means develops a comb filter effect, said timbre correcting means including decorrelating means for reducing the comb filter effect that would otherwise occur when the surround channel is reproduced by a plurality of loudspeaker means.

32. The sound system of claim 31, wherein said motion picture soundtrack is equalized for playback in a room whose room-loudspeaker system is aligned to the standard motion picture theater X-curve, wherein the means for coupling the signal derived from the center sound channel to the loudspeaker means includes soundtrack timbre correcting means for changing the frequency response of the signal derived from the center sound channel to compensate for said X-curve equalization.

33. A sound system for reproducing a motion picture soundtrack having a plurality of sound channels, including a surround sound channel, in a room, comprising first and second surround loudspeaker means for generating, when located in their operating positions with respect to the room, in response to first and second surround input signals, first and second surround sound fields having direct and diffuse sound field components in which the diffuse sound field component is predominant over the direct sound field component at listening positions within the room, said first and second additional loudspeaker means when located in their operating positions with respect to the room and reproducing said surround channel developing a comb filter effect, means for deriving a surround sound signal from the surround sound channel, and decorrelating means for deriving from the surround sound signal first and second surround input signals decorrelated with respect to each other and for applying said surround input signals to said first and second surround loudspeaker means, respectively, thereby reducing the comb filter effect that would otherwise occur when the surround channel is reproduced by the first and second surround loudspeaker means.

34. The sound system of claim 33 wherein the decorrelating means has neutral timbre.

35. The sound system of claim 33, wherein said motion picture soundtrack is equalized for playback in a room whose room-loudspeaker system is aligned to the standard motion picture theater X-curve, wherein the means for deriving the surround sound signal from the surround sound channel includes soundtrack timbre correcting means for changing the frequency response of the surround sound signal to compensate for said X-curve equalization.

36. The sound system of claims 33 or 35 wherein the other one or ones of said plurality of sound channels when applied to loudspeaker means located in its or their operating positions in the room produce one or more sound fields generating listener-perceived differences in timbre between said one or more sound fields and said first and second surround sound fields, the means deriving the surround sound signal from the surround sound channel including surround sound channel timbre correcting means for changing the frequency response of the surround sound channel to correct the listener-perceived difference in timbre between the surround sound channel sound fields and the sound field or sound fields of the other one or ones, respectively, of said plurality of sound channels.

37. A sound system for reproducing a motion picture soundtrack in a relatively small room, such as in a home, wherein said motion picture soundtrack is equalized for playback in a room whose room-loudspeaker system is aligned to the standard motion picture theater X-curve, the motion picture soundtrack having a plurality of sound channels including left, right, and surround sound channels, the plurality of sound channels being carried in left total and right total signals, comprising decoding and soundtrack timbre correcting means receiving the left total and right total input signals for generating left, right, and surround sound channel signals in response to the left total and right total input signals and for changing the frequency response of at least the left and right sound channels to compensate for said X-curve equalization, and loudspeaker means for generating, when located in its or their operating positions with respect to the room, left, right, and surround channel sound fields at listening positions within the room in response to the left, right, and surround sound channel signals.

38. The sound system of claim 37 wherein the decoding and soundtrack timbre correcting means is further for changing the frequency response of the surround channel to compensate for said X-curve equalization.

39. A sound system for reproducing a motion picture soundtrack in a relatively small room, such as in a home, wherein said motion picture soundtrack is equalized for playback in a room whose room-loudspeaker system is aligned to the standard motion picture theater X-curve, the motion picture soundtrack having a plurality of sound channels including left, center, and right sound channels, the plurality of sound channels being carried in left total and right total signals, comprising decoding and soundtrack timbre correcting means receiving the left total and right total input signals for generating left, center and right sound channel signals in response to the left total and right total input signals and for changing the frequency response of at least the left, right, and center sound channels to compensate for said X-curve equalization, and loudspeaker means for generating, when located in its or their operating positions with respect to the room, left, center, and right sound fields at listening positions within the room in response to the left, center, and right sound channel signals.

40. The sound system of claim 39 wherein the system is also for reproducing a surround sound channel, the decoding and soundtrack timbre correcting means further generating surround sound channel signals in response to the left total and right total input signals, and the loudspeaker means further generating, when located in its or their operating positions with respect to the room, a surround channel sound field at listening positions within the room in response to the surround channel signals.

41. The sound system of claim 40 wherein the decoding and soundtrack timbre correcting means is further for changing the frequency response of the surround channel to compensate for said X-curve equalization.

42. The sound system of claims 38, 39, or 41 wherein the decoding and soundtrack timbre correcting means comprises separate decoding means and soundtrack timbre correcting means, and the left total and right total input signals are processed by the soundtrack-timbre correcting means before the signals are applied to the decoding means.

43. The sound system of to claims 37, 38, 39, 40, or 41 wherein the decoding and soundtrack timbre correcting means comprises separate decoding means and soundtrack timbre correcting means, and the decoding means processes the left total and right total input signals and the soundtrack timbre correcting means processes the multiple sound channel outputs of the decoding means.

44. A decoder for use in a sound system for reproducing in a relatively small room, such as in a home, a motion picture soundtrack having a plurality of sound channels, including left, right, and surround sound channels, the plurality of sound channels being carried in left total and right total signals, wherein said motion picture soundtrack is equalized for playback in a room whose room-loudspeaker system is aligned to the standard motion picture theater X-curve, comprising decoding means for generating left, right, and surround sound channel signals in response to the left total and right total input signals, and soundtrack timbre correcting means for changing the frequency response of the left and right sound channels to compensate for said X-curve equalization.

45. The decoder of claim 44 wherein the soundtrack timbre correcting means is further for changing the frequency response of the surround channel to compensate for said X-curve equalization.

46. A decoder for use in a sound system for reproducing in a relatively small room, such as in a home, a motion picture soundtrack having a plurality of sound channels, including left, center, and right sound channels, the plurality of sound channels being carried in left total and right total signals, wherein said motion picture soundtrack is equalized for playback in a room whose room-loudspeaker system is aligned to the standard motion picture theater X-curve, comprising decoding means for generating left, center, and right sound channel signals in response to the left total and right total input signals, and soundtrack timbre correcting means for changing the frequency response of the left, center, and right sound channels to compensate for said X-curve equalization.

47. The decoder of claim 46 also for reproducing a surround sound channel wherein the decoding means further generates a surround sound channel signal in response to the left total and right total input signals.

48. The decoder of claim 47 wherein the soundtrack timbre correcting means is further for changing the frequency response of the surround channel to compensate for said X-curve equalization.

49. The decoder of claims 44, 45, 47, or 48 wherein said surround sound channel when applied to loudspeaker means located in its or their operating positions in the room and the sound channels other than said surround sound channel when applied to loudspeaker means located in its or their operating positions in the room produce sound fields generating listener-perceived differences in timbre between the sound field resulting from said surround sound channel and the sound fields resulting from the sound channels other than said surround sound channel, further comprising surround timbre correcting means for changing the frequency response of the surround channel to correct the listener-perceived difference in timbre between the sound field resulting from said surround sound channel and the sound fields resulting from the sound channels other than said surround sound channel.

50. The decoder of claims 44, 45, 47, or 48 for use in a sound system in which the surround sound channel signal is reproduced by a plurality of loudspeaker means, wherein said surround sound channel signal when reproduced by a plurality of loudspeaker means develops a comb filter effect, the combination further comprising decorrelating means for reducing the comb filter effect that would otherwise occur when the surround channel is reproduced by a plurality of loudspeaker means, the decorrelating means having neutral timbre.

51. A method for reproducing motion picture soundtrack in a relatively small room, such as in a home, wherein said motion picture soundtrack is equalized for playback in a room whose room-loudspeaker system is aligned to the standard motion picture theater X-curve, comprising deriving a signal from the soundtrack, changing the frequency response of the signal derived from the soundtrack to compensate for said X-curve equalization, and generating at least one sound field in response to the frequency response changed signal.

52. The method of claim 51 for reproducing a motion picture soundtrack, the motion picture soundtrack having a plurality of sound channels, including left and right sound channels, wherein the step of deriving a signal from the soundtrack derives a left channel signal from the left sound channel and a right channel signal from the right sound channel, the step of changing the frequency response of the signal derived from the soundtrack changes the frequency response to the left channel signal and of the right channel signal, and the step of generating at least one sound field in response to the frequency response changed signal generates a first sound field in response to the frequency response changed left channel signal and generates a second sound field in response to the frequency response changed right channel signal.

53. The method of claim 52 for reproducing a motion picture soundtrack, the motion picture soundtrack additionally including a surround sound channel, further comprising generating, in response to the surround sound channel, a surround sound field at listening positions within the room.

54. The method of claim 53, further comprising generating, in response to the surround sound channel, a further surround sound field, wherein said surround sound fields develop a comb filter effect, at least one of the surround sound fields being generated in a way that reduces the comb filter effect.

55. The method of claims 53 or 54, wherein the first and second sound fields each have direct and diffuse sound field components and the direct sound field component of each of the first and second sound fields is predominant over the diffuse sound field component at listening positions within the room, and each surround sound field has a direct and diffuse sound field component and the diffuse sound field component of each surround sound field is predominant over the direct sound field component at listening positions within the room.

56. The method of claim 55, wherein there is a listener-perceived difference in timbre between sound fields produced by said surround sound channel and the other sound channels, further comprising changing the frequency response of the surround sound channel to correct said listener-perceived difference in timbre.

57. In a sound system for reproducing in a room a motion picture soundtrack having a plurality of sound channels including a surround sound channel, wherein there is a listener-perceived difference in timbre between sound fields produced by said surround sound channel and the other sound channels, a method for reproducing the surround sound channel, comprising deriving a surround sound channel signal from the surround sound channel, changing the frequency response of the surround sound channel signal to correct said listener-perceived difference in timbre, wherein said changing corrects the listener-perceived difference in frequency response substantially in accordance with a correction characteristic corresponding to a characteristic representing the difference between the steady-state sound level spectra between a front loudspeaker position and a side loudspeaker position, measurements of said spectra derived using an acoustic testing manikin and a measurement microphone, differences between measurement microphone and manikin data having been subtracted to eliminate the effects of the specific room and loudspeaker characteristics, and generating a surround sound field in response to the frequency response changed surround sound channel signal.

58. The method of claim 57 for reproducing a motion picture soundtrack having a plurality of sound channels, said motion picture soundtrack additionally including left and right sound channels having direct and diffuse sound field components, wherein the surround sound field has direct and diffuse sound field components and the diffuse sound field component of the surround sound field is predominant over the direct sound field component at listening positions within the room, and the method further comprises generating, in response to the left and right sound channels, first and second sound fields in which the direct sound field component of each sound field is predominant over the diffuse sound field component at listening positions within the room.

59. The method of claim 58 further comprising generating, in response to the frequency response changed surround sound channel signal, a further surround sound field, wherein said further surround sound field has direct and diffuse sound field components and said surround sound fields develop a comb filter effect, the diffuse sound field component of the further surround sound field being predominant over the direct sound field component at listening positions within the room, and at least one of the surround sound fields being generated in a way that reduces the comb filter effect.

60. The method of claim 57, 58, or 59, wherein said motion picture soundtrack is equalized for playback in a room whose room-loudspeaker system is aligned to the standard motion picture theater X-curve, wherein the frequency response of the left, right and surround channels is changed to compensate for said X-curve equalization.

61. The sound system of claim 1 wherein said soundtrack timbre correcting means compensates for said X-curve equalization substantially in accordance with a correction curve derived from the difference in steady-state one-third octave sound level spectra taken in representative X-curve aligned large auditoriums in comparison to good quality modern home consumer loudspeaker-room sound systems.

62. The sound system of claim 15 wherein said soundtrack timbre correcting means compensates for said X-curve equalization substantially in accordance with a correction curve derived from the difference in steady-state one-third octave sound level spectra taken in representative X-curve aligned large auditoriums in comparison to good quality modern home consumer loudspeaker-room sound systems.

63. The sound system of claim 37 wherein said decoding and soundtrack timbre correcting means compensates for said X-curve equalization substantially in accordance with a correction curve derived from the difference in steady-state one-third octave sound level spectra taken in representative X-curve aligned large auditoriums in comparison to good quality modern home consumer loudspeaker-room sound systems.

64. The sound system of claim 39 wherein said decoding and soundtrack timbre correcting means compensates for said X-curve equalization substantially in accordance with a correction curve derived from the difference in steady-state one-third octave sound level spectra taken in representative X-curve aligned large auditoriums in comparison to good quality modern home consumer loudspeaker-room sound systems.

65. The decoder of claim 44 wherein said soundtrack timbre correcting means compensates for said X-curve equalization substantially in accordance with a correction curve derived from the difference in steady-state one-third octave sound level spectra taken in representative X-curve aligned large auditoriums in comparison to good quality modern home consumer loudspeaker-room sound systems.

66. The decoder of claim 46 wherein said soundtrack timbre correcting means compensates for said X-curve equalization substantially in accordance with a correction curve derived from the difference in steady-state one-third octave sound level spectra taken in representative X-curve aligned large auditoriums in comparison to good quality modern home consumer loudspeaker-room sound systems.

67. The method of claim 51 wherein said changing the frequency response of the signal derived from the soundtrack compensates for said X-curve equalization substantially in accordance with a correction curve derived from the difference in steady-state one-third octave sound level spectra taken in representative X-curve aligned large auditoriums in comparison to good quality modern home consumer loudspeaker-room sound systems.

* * * * *

United States Patent and Trademark Office

CERTIFICATE OF CORRECTION

PATENT NO.: 5,222,059
DATED : 6/22/93
INVENTORS : Tomlinson Holman

It is certified that error appears in the above-identified patent and that said Letters Patent is hereby corrected as shown below:

Column 2, line 16, "perceived" should be italicized;

Column 2, line 18, "measure" should be italicized;

Column 8, line 67, "frequency" should be --frequently--;

Column 9, line 56, "that" should be --about--;

Column 10, line 29, "sound track" should be --soundtrack--;

Column 14, line 58, "the" should be --that--;

Column 24, line 55, "to" should be deleted;

Column 26, line 23, "to" should be --of--.

Signed and Sealed this

Seventeenth Day of December, 1996

Attest:

Bruce Lehman

BRUCE LEHMAN

*Attesting Officer*

*Commissioner of Patents and Trademarks*